United States Patent
Satterwhite

(10) Patent No.: US 9,328,852 B2
(45) Date of Patent: May 3, 2016

(54) DEVICE FOR RETAINING THE LOOSE END OF A WIRE IN A DESIRED POSITION DURING CONSTRUCTION

(71) Applicant: Jeffrey Bryan Satterwhite, Raleigh, NC (US)

(72) Inventor: Jeffrey Bryan Satterwhite, Raleigh, NC (US)

( * ) Notice: Subject to any disclaimer, the term of this patent is extended or adjusted under 35 U.S.C. 154(b) by 1 day.

(21) Appl. No.: 14/794,018

(22) Filed: Jul. 8, 2015

(65) Prior Publication Data

US 2016/0047495 A1    Feb. 18, 2016

Related U.S. Application Data

(60) Provisional application No. 62/036,678, filed on Aug. 13, 2014.

(51) Int. Cl.
| | |
|---|---|
| *F16L 3/123* | (2006.01) |
| *F16L 5/00* | (2006.01) |
| *H02G 3/22* | (2006.01) |
| *F16L 3/12* | (2006.01) |
| *E04B 2/56* | (2006.01) |
| *H02G 3/12* | (2006.01) |

(52) U.S. Cl.
CPC ............... *F16L 3/1218* (2013.01); *E04B 2/56* (2013.01); *F16L 3/1222* (2013.01); *F16L 5/00* (2013.01); *H02G 3/126* (2013.01); *H02G 3/22* (2013.01)

(58) Field of Classification Search
CPC ............... F16L 5/00; F16L 3/003; F16L 3/08; F16L 3/1218; F16L 3/1222; F16L 3/1233; F16L 3/127; F16L 3/18; H02G 3/22; H02G 3/30; H02G 3/36; H02G 3/126; H02G 3/125
USPC .......... 52/220.1, 220.8; 248/218.4, 219.1, 65, 248/74.1, 315, 205.1; 174/480, 503; 439/538; 220/3.3, 3.9
See application file for complete search history.

(56) References Cited

U.S. PATENT DOCUMENTS

| | | | | |
|---|---|---|---|---|
| 1,796,037 | A * | 3/1931 | Mangin ................ | H02G 3/125 220/3.4 |
| 2,214,968 | A * | 9/1940 | MacMillen ........... | H02G 3/125 220/3.9 |
| 2,480,805 | A * | 8/1949 | Buckels ................ | H02G 3/125 174/503 |
| 2,989,206 | A * | 6/1961 | McAfee ................ | H02G 3/126 220/3.7 |
| 3,724,795 | A * | 4/1973 | Callanan .............. | H02G 3/125 174/58 |
| 4,176,758 | A * | 12/1979 | Glick .................... | H02G 3/125 174/58 |
| 4,569,458 | A * | 2/1986 | Horsley ................ | H02G 3/125 220/3.6 |
| 4,605,190 | A * | 8/1986 | Kamp .................... | A45B 1/00 248/229.26 |
| 4,778,399 | A * | 10/1988 | Schenk ................. | H01R 27/00 174/481 |
| 4,801,121 | A * | 1/1989 | Zunker ................. | E05B 67/383 248/218.4 |
| 4,842,551 | A * | 6/1989 | Heimann .............. | H01R 27/00 174/58 |

(Continued)

FOREIGN PATENT DOCUMENTS

GB          2130077 A *    5/1984    ............ F16L 3/1075

*Primary Examiner* — Robert Canfield

(74) *Attorney, Agent, or Firm* — Carla Gannon Law

(57) ABSTRACT

A device retains dangling electrical wire at a desired location during the construction process so subsequently hung drywall doesn't conceal the wire end that is intended to be exposed. The device includes a primary face and flange which are approximately perpendicular, and a channel protruding from the primary face. The primary face and flange hug the corner of a wall stud, and a loose end of electrical wire is threaded through the channel. When drywall is hung, a pre-measured and pre-cut drywall hole is positioned to surround the hole and wire segment so the wire end is available for use in wiring light fixtures and the like.

17 Claims, 10 Drawing Sheets

(56) References Cited

U.S. PATENT DOCUMENTS

| | | | | |
|---|---|---|---|---|
| 4,863,399 A * | 9/1989 | Medlin, Jr. | H02G 3/125 | 248/27.1 |
| 4,880,128 A * | 11/1989 | Jorgensen | H02G 3/20 | 220/3.9 |
| 4,964,525 A * | 10/1990 | Coffey | H02G 3/125 | 220/3.9 |
| 5,064,386 A * | 11/1991 | Dale | H01R 2/778 | 220/3.5 |
| 5,221,814 A * | 6/1993 | Colbaugh | H02G 3/14 | 174/58 |
| 5,263,676 A * | 11/1993 | Medlin, Jr. | H02G 3/126 | 220/3.6 |
| 5,287,665 A * | 2/1994 | Rath, Jr. | H02G 3/126 | 220/3.3 |
| 5,330,144 A * | 7/1994 | Stevenson | H04R 1/025 | 248/231.9 |
| 5,448,011 A * | 9/1995 | Laughlin | H02G 3/126 | 174/480 |
| 5,450,974 A * | 9/1995 | Lippa | H02G 3/126 | 220/3.8 |
| 5,527,990 A * | 6/1996 | Comerci | H02G 3/126 | 174/502 |
| 5,598,998 A * | 2/1997 | Lynn | H02G 1/00 | 220/3.3 |
| 5,765,786 A * | 6/1998 | Gretz | H02G 3/26 | 248/68.1 |
| 5,841,068 A * | 11/1998 | Umstead | H02G 3/126 | 174/58 |
| 6,066,803 A * | 5/2000 | Hagarty | H02G 3/086 | 174/50 |
| 6,103,972 A * | 8/2000 | Hagarty | H02G 3/081 | 174/53 |
| 6,423,899 B1 * | 7/2002 | Reiker | E04B 9/006 | 174/58 |
| 6,608,252 B2 * | 8/2003 | Hurley | H02G 3/02 | 174/53 |
| 6,774,308 B1 * | 8/2004 | Troyen | H02G 3/10 | 138/115 |
| 6,858,802 B2 * | 2/2005 | Hagarty | H02G 15/10 | 174/53 |
| 6,900,386 B2 * | 5/2005 | Chung | H02G 3/126 | 174/50 |
| D506,385 S * | 6/2005 | Brown | D8/394 | |
| 7,141,736 B2 * | 11/2006 | Plankell | H02G 3/123 | 174/50 |
| 7,214,876 B1 * | 5/2007 | Haberek | H02G 3/126 | 174/135 |
| 7,642,471 B2 * | 1/2010 | Whitaker | H02G 3/126 | 174/480 |
| 7,714,227 B2 * | 5/2010 | Sparrowhawk | H02G 3/126 | 174/50 |
| 8,333,359 B2 * | 12/2012 | Gordon | E06B 1/6015 | 248/223.21 |
| RE45,355 E * | 2/2015 | Root | E06B 1/6015 | 49/380 |
| 9,083,166 B2 * | 7/2015 | Gagne | H02G 3/086 | |
| 2002/0020542 A1 * | 2/2002 | Reiker | H01R 4/2433 | 174/53 |
| 2003/0014939 A1 * | 1/2003 | DeWall | H02G 3/086 | 52/741.1 |
| 2004/0051648 A1 * | 3/2004 | Hagarty | H02G 15/10 | 340/693.9 |
| 2005/0194173 A1 * | 9/2005 | Smith | H02G 3/126 | 174/58 |
| 2007/0074888 A1 * | 4/2007 | Page | H02G 3/00 | 174/58 |
| 2007/0079981 A1 * | 4/2007 | Dinh | H02G 3/126 | 174/58 |
| 2009/0077910 A1 * | 3/2009 | Gordon | E06B 1/60 | 52/213 |
| 2009/0094911 A1 * | 4/2009 | Whitaker | H02G 3/126 | 52/220.2 |
| 2009/0114776 A1 * | 5/2009 | Julian | F16L 3/127 | 248/65 |
| 2010/0288894 A1 * | 11/2010 | Hopkins | H02G 3/32 | 248/220.21 |
| 2013/0334392 A1 * | 12/2013 | Hill | F16M 13/00 | 248/500 |

* cited by examiner

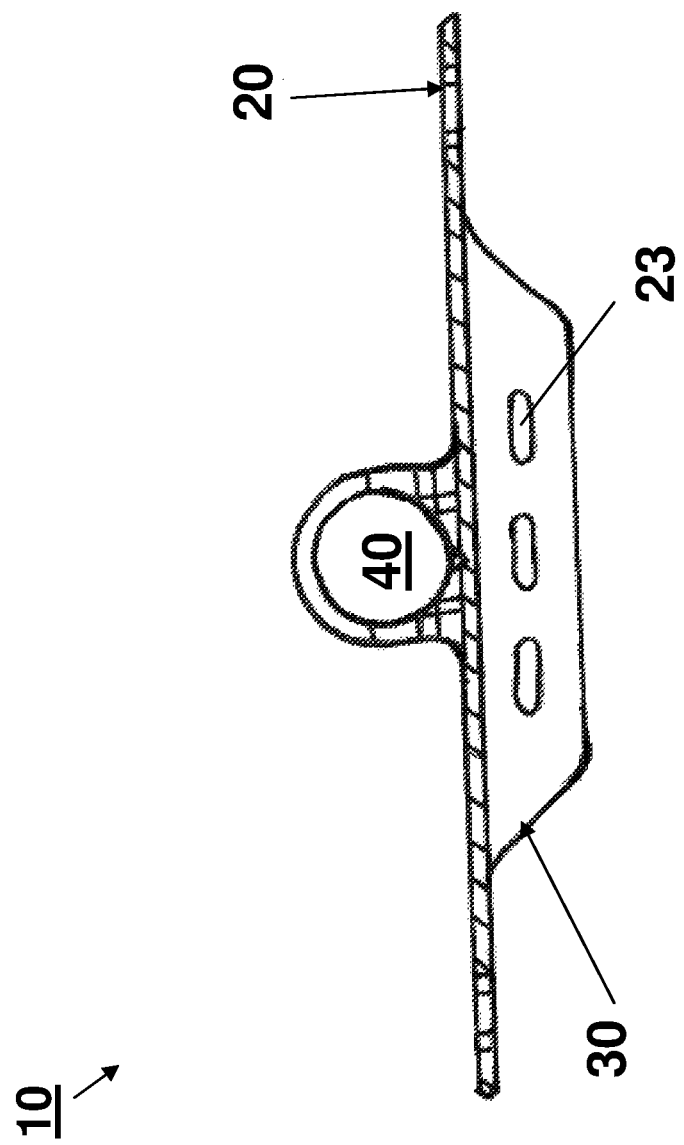

DEVICE FOR RETAINING THE LOOSE END OF A WIRE IN A DESIRED POSITION DURING CONSTRUCTION

CROSS-REFERENCE TO RELATED APPLICATIONS

This application claims priority from the U.S. provisional patent application entitled DEVICE FOR RETAINING AN ELECTRICAL WIRE ADJACENT TO AN INTENDED DRYWALL PROTRUSION SITE, which was filed on Aug. 13, 2014, and assigned the Ser. No. 62/036,678.

BACKGROUND OF THE INVENTION

The present invention relates to building hardware, and more specifically to a device for slidably securing an electrical wire to a stationary object such as a wall stud, such that the electrical wire projects outwardly and is less likely to be inadvertently concealed in the drywalling process.

New residential and commercial structures are typically constructed in phases. More specifically, a structure is framed; plumbing, HVAC and electrical wiring are added; dry wall is hung; fixtures are installed; and finishing work such as painting and trim is completed. Each phase is typically accomplished by tradespersons specifically hired for their expertise, with all phases overseen by a contractor or construction superintendent.

The work of one tradesperson often negatively affects the work of another tradesperson. For example, an electrician may wire a house and leave certain wires dangling in the kitchen for subsequently powering under-cabinet light fixtures, and a drywall installer may completely conceal those dangling wires behind drywall. Indeed it is the experience of the inventor that wires which are intended to protrude from drywall for subsequent use are often concealed behind drywall. Finding "lost" wire ends requires cutting and subsequently patching drywall, often multiple times, which is labor intensive, and creates imperfections in the wall's appearance. Alternatively, sometimes a drywall installer will recognize that a dangling wire is intended to protrude through the drywall, and establish a drywall hole and extend the dangling end there through. This is problematic when the drywall installer places the wire through the drywall in the wrong location.

As can be seen, there is a need for a device that unambiguously establishes where a dangling wire is to protrude through drywall. It is desirable that this device is small, inexpensive to manufacture and transport, and easy to use. It is also desirable that the device can be adapted for a variety of circumstances including thick walls.

SUMMARY OF THE INVENTION

The present invention is a device that attaches to the corner of a wall stud and includes a channel for slidably engaging a wire. The device generally includes a substantially planar primary face that is perpendicular to a substantially planar flange. Both the primary face and flange include securing apertures, preferably sized and spaced one-from-another for receiving electrical staples commonly used in the industry. Protruding from the primary face is a channel that is sized to accept standard electrical wiring. The channel is preferably longitudinally parallel to the planar surface of the primary face. In use one would attach the device to a wall stud in a position correlating with where a dangling wire is to protrude through subsequently hung drywall; thread the dangling wire through the channel of the device; and drywall as usual except allowing the channel (and wire segment) to protrude through a hole in the drywall.

BRIEF DESCRIPTION OF THE DRAWINGS

FIG. 6 is a cross-section view of the device taken along A-A of FIG. 5;
FIGS. 7A-7G depict installation and use of device with:
FIG. 7A showing a dangling wire between two exposed wall studs;
FIG. 7B showing a device attached to the right wall stud;
FIG. 7C showing the dangling wire threaded through the device;
FIG. 7D showing an intact sheet of drywall;
FIG. 7E showing a sheet of drywall including a drywall hole;
FIG. 7F showing a sheet of drywall in situ with the underlying structures in phantom;
and
FIG. 7G showing the dangling wire and wire channel protruding from the drywall.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various FIGS.:
10—Retaining device;
20—Primary face;
21—Primary face surface;
23—Securing aperture;
25—Centering mark;
30—Flange;
31—Flange surface;
40—Wire channel;
45—Conduit;
50—Wire;
55—Second wire;
60—Stud;
61—Planar side;
80—Drywall; and
82—Drywall hole.

Figure 1:
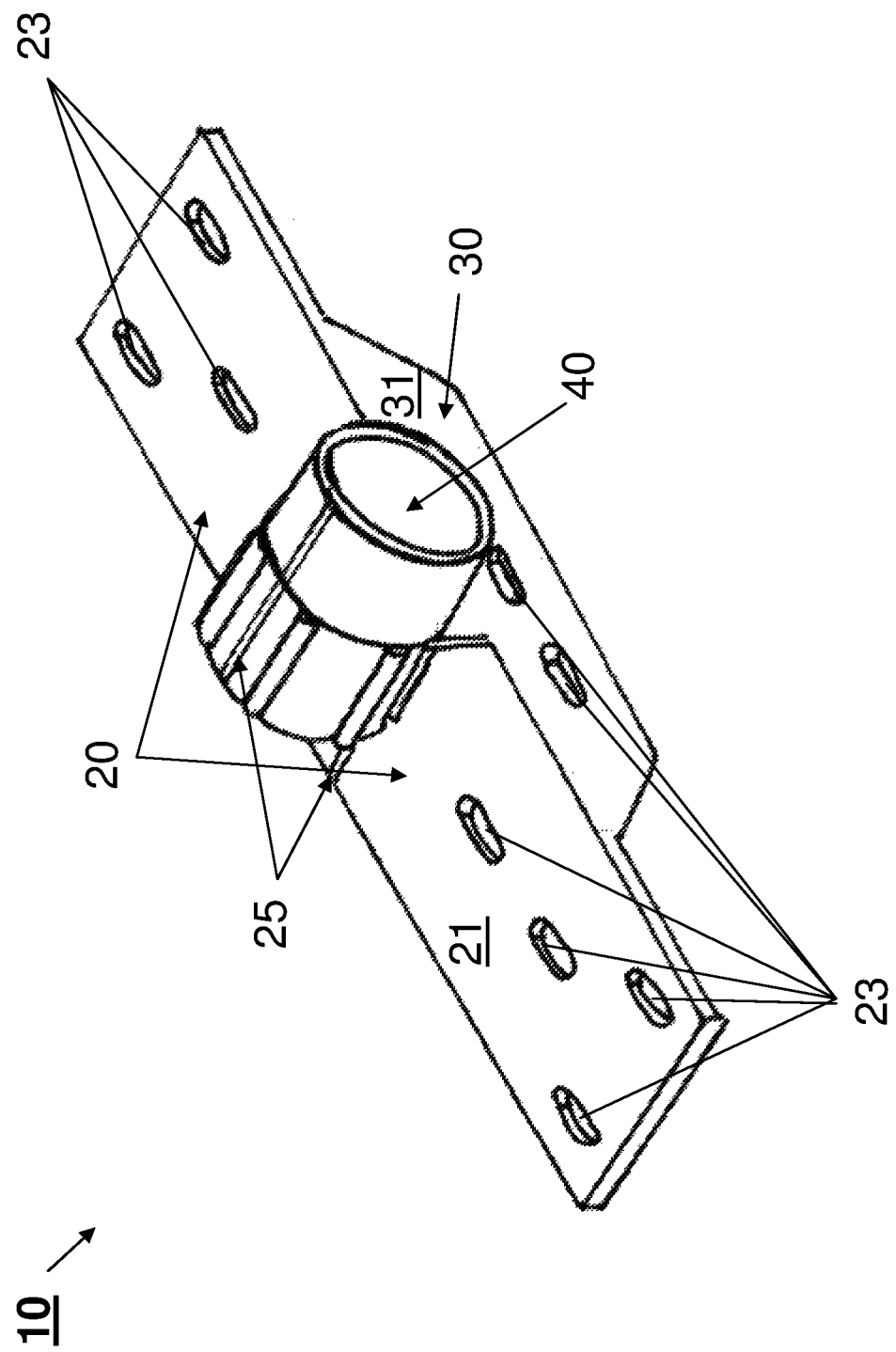
FIG. 1 is a perspective view of the device.
Figure 2:
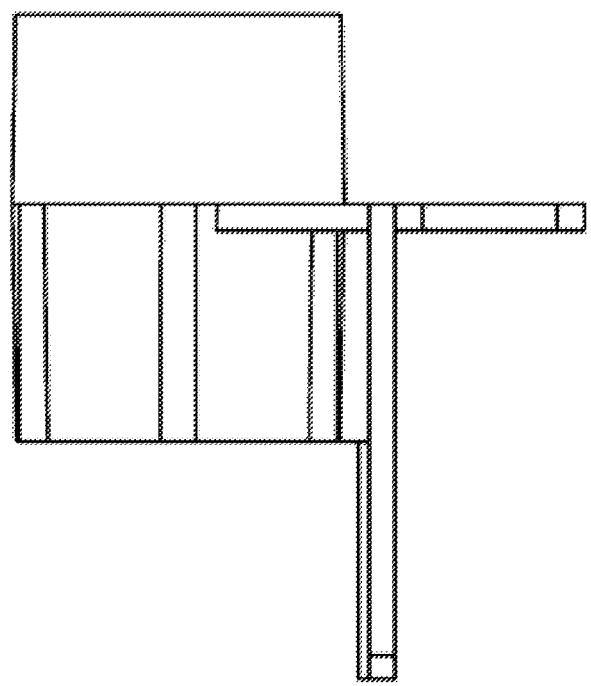
FIG. 2 is an engineering drawing of the side view of the device including preferred dimensions.

Referring to FIG. 1, retaining device 10 generally includes a substantially planar primary face 20 that is approximately perpendicular to substantially planar flange 30. Primary face 20 includes primary face surface 21, with an opposing primary face surface on the other side (not shown). Likewise, flange 30 includes flange surface 31, with an opposing flange surface on the other side (not shown). Both the primary face and flange include securing apertures 23, for receiving securing means. Securing apertures are preferably sized and spaced one-from-another for receiving electrical staples commonly used in the industry such as Gardner Bender, which is commercially available from Ace Hardware of Oak Brook, Ill., under the name of GB 9/16 in ×1¼ in Metal Wire Staple (MS-1577), item number 3005972. Device 10 can be attached to corner of stud 60 (shown in FIG. 8) by securing means, not shown, such as screws, nails, adhesives, and the like, such that primary face surface 21 of primary face 20 is in direct contact with one planar side 61 of stud 60, and flange surface 31 of flange 30 is in direct contact with an adjoining planar side 61. Protruding outwardly from primary face 20 is channel 40, which is sized to accept standard electrical wiring such as Romex 12-2 wire which is commercially available from Home Depot of Atlanta Ga. under the name of ft. 12/2 NM-B Wire Model #28828269.

Figure 4:
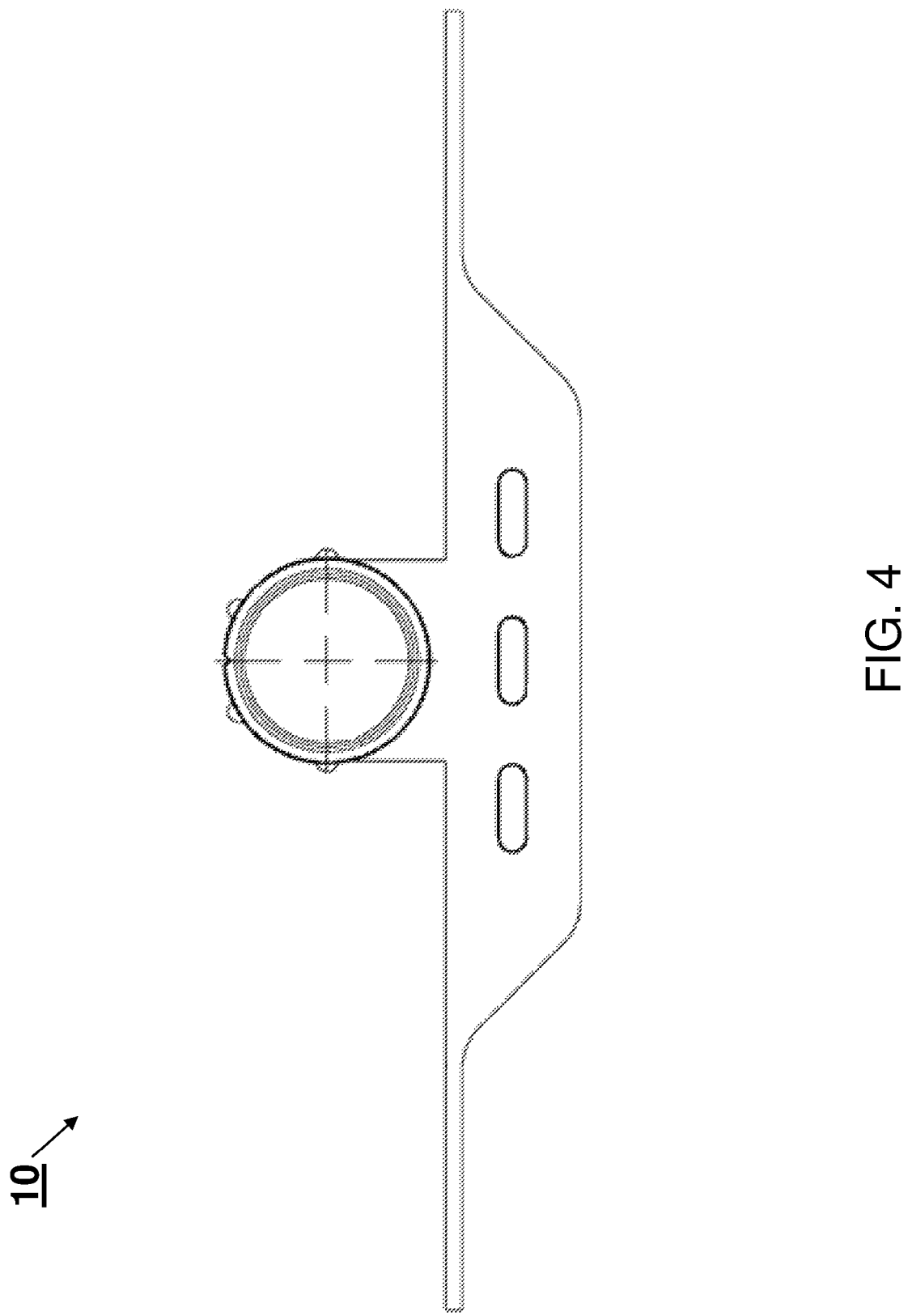
FIG. 4 is an engineering drawing of the front view of the device including preferred dimensions.

As shown best in FIG. 4, channel 40 is preferably longitudinally perpendicular to the planar surface of flange 30. Said another way, channel 40 is preferably longitudinally parallel to the planar surface of primary face 20, as best shown in FIG. 1.

Figure 8:
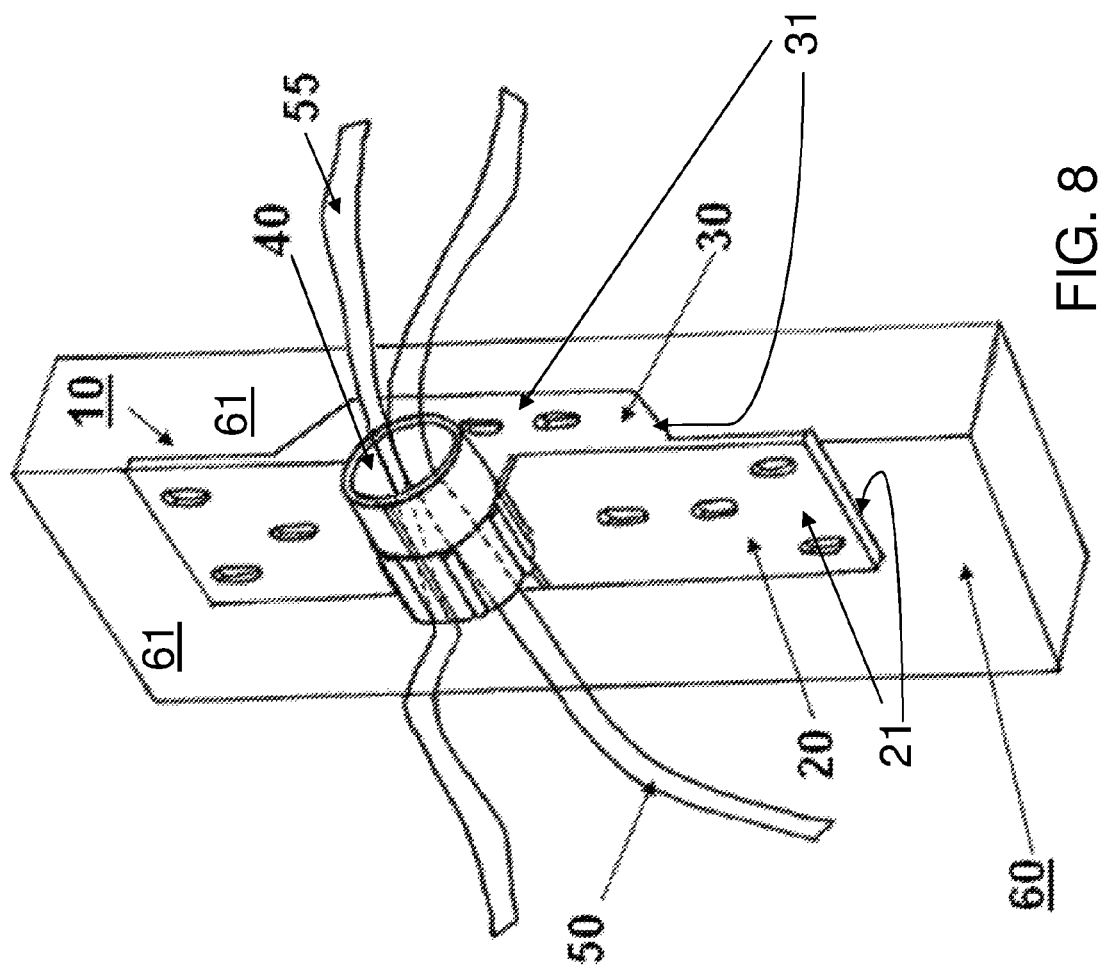
FIG. 8 depicts the device mounted to a stud with a wire protruding through the channel.

As shown in FIG. 8, wire 50 is threaded through wire channel 40. Although not shown, it should be understood that the dangling end of wire 50 protrudes through the front (distal) end of channel 40, with the attached end upstream of channel 40. In this manner the "loose end" of wire 50 is accessible after installing the drywall.

Figure 5:
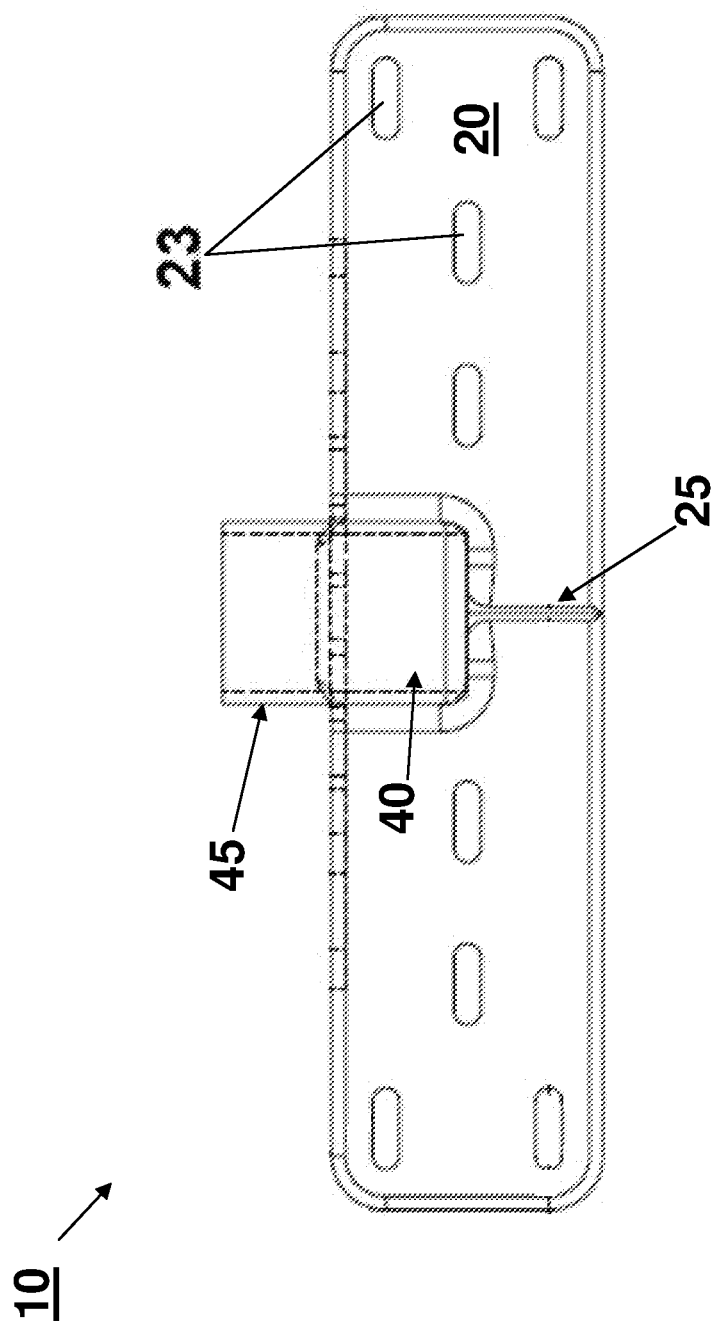
FIG. 5 is an engineering drawing of the bottom of the device including preferred dimensions.
Figure 7A:
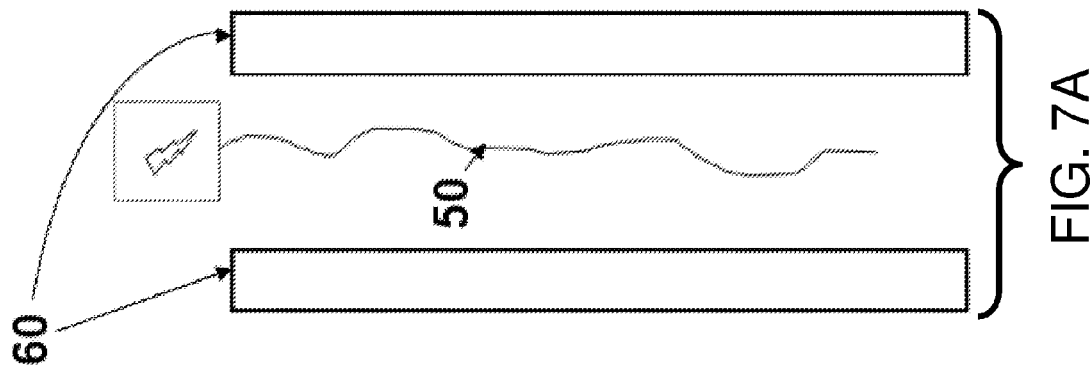
Figure 7B:
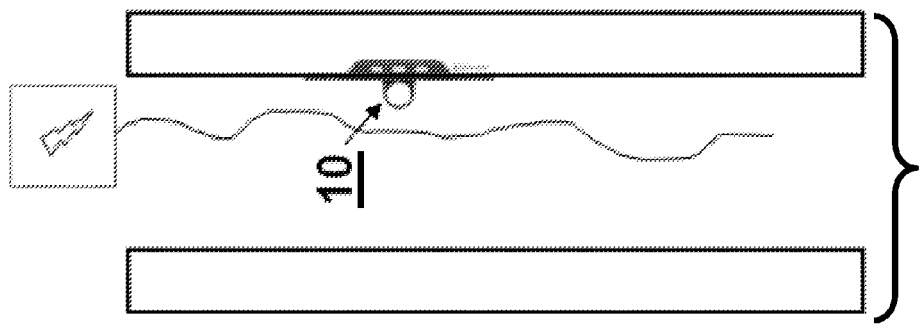
Figure 7C:
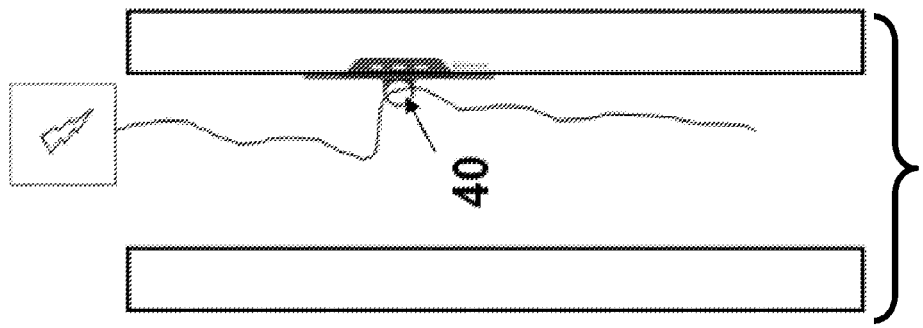
Figure 7E:
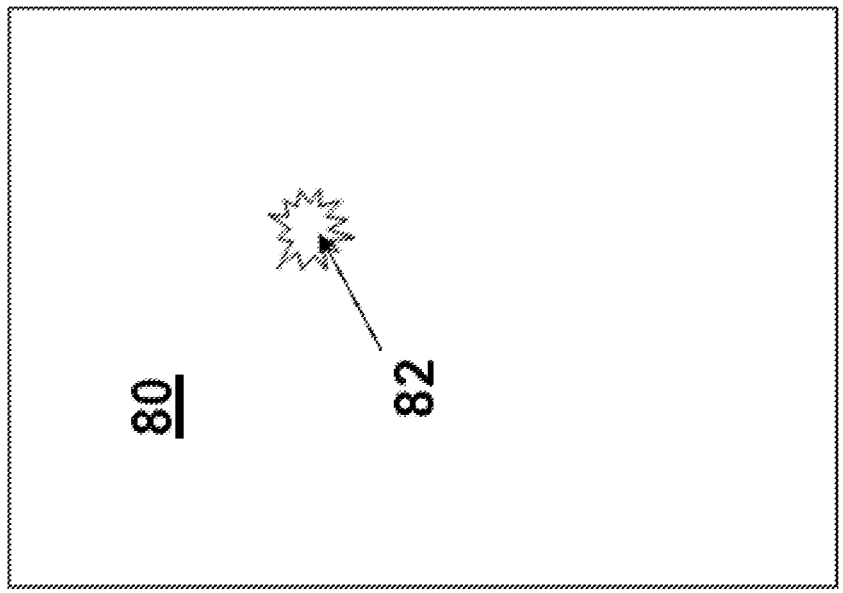
Figure 7D:
Figure 7G:
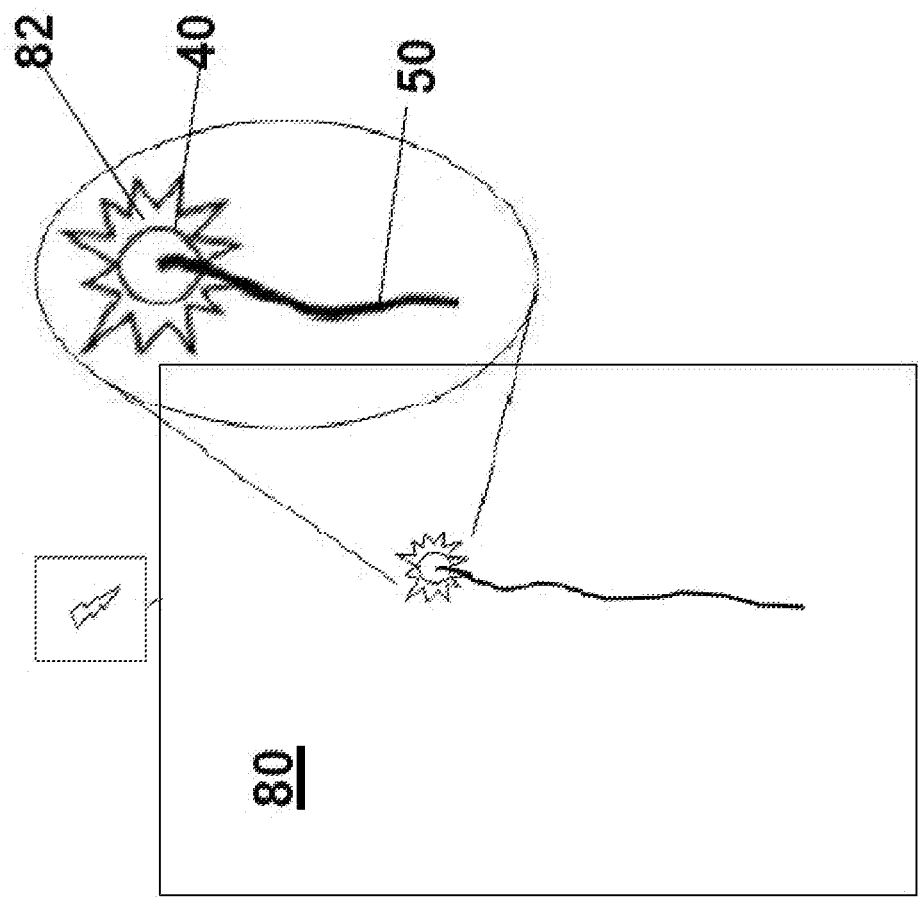
Figure 7F:
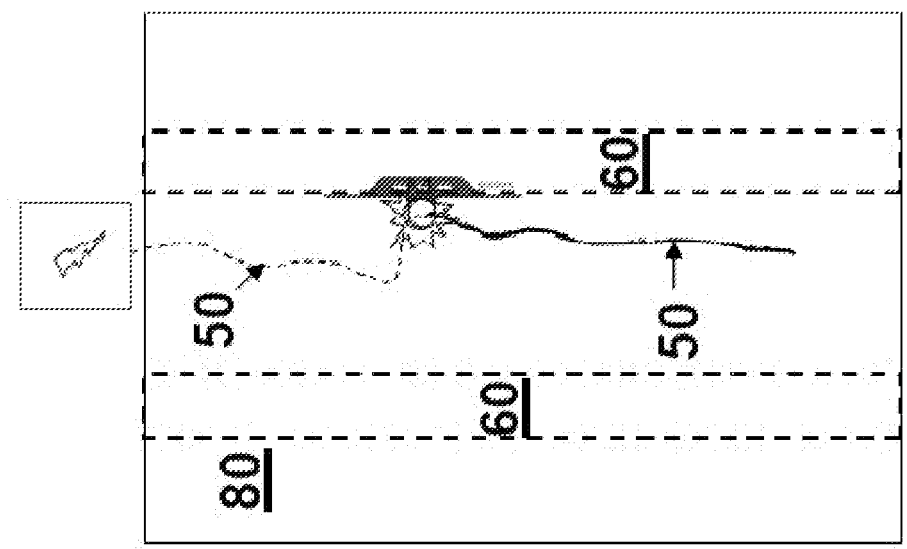

FIG. 5 depicts conduit 45 releasably engaged with underlying channel 40. This configuration would effectively lengthen channel 40 to accommodate thicker walls and the like. Said another way, conduit 45 extends the length of channel 40. Conduit 45 is preferably PVC Coupling, which is commercially available from Cantex of Fort Worth Tex., under the name of ¾ PVC Coupling Model # R6141624M.

Figure 3:
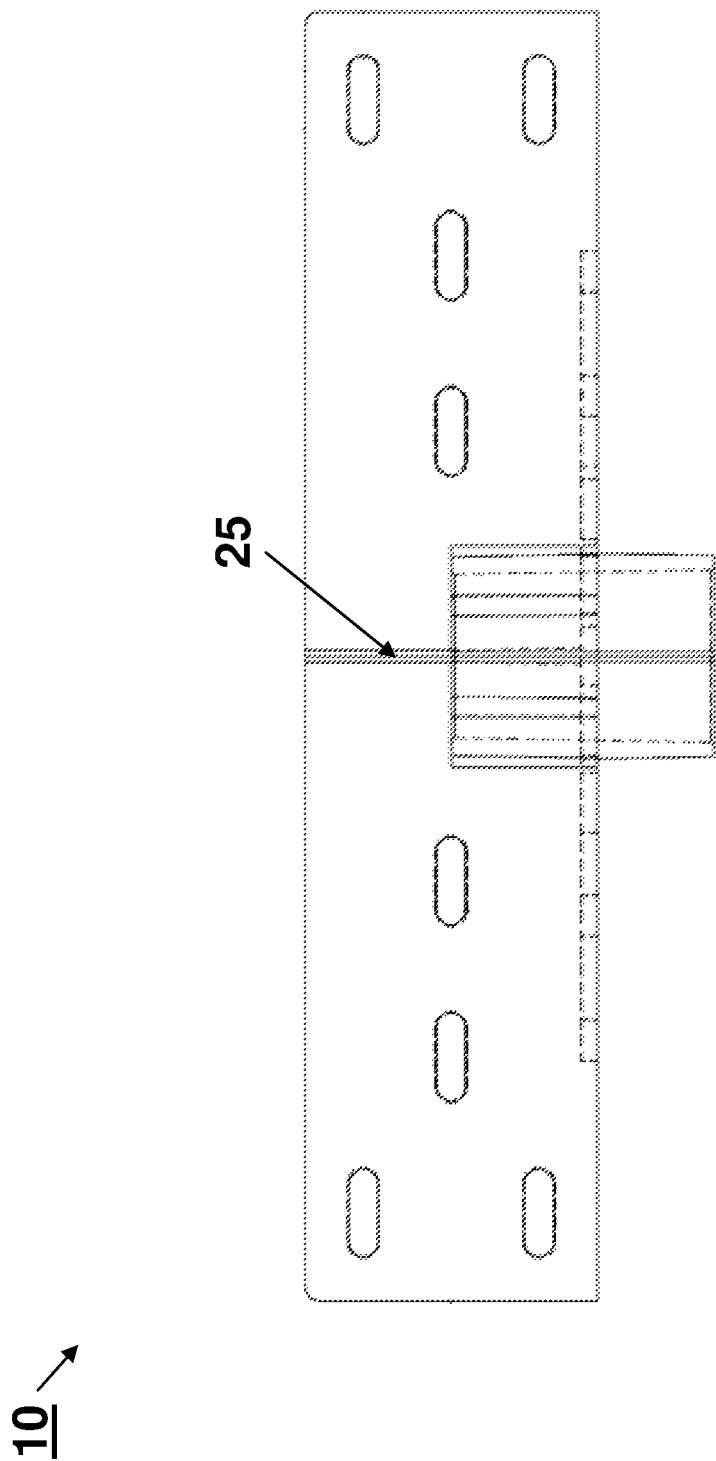
FIG. 3 is an engineering drawing of the top view of the device including preferred dimensions.

As shown in FIGS. 1, 3 and 5, it is preferred that the device includes centering mark 25 for purposes of properly aligning the device while in use.

Preferred dimensions and orientations are set forth in the engineering drawings of FIGS. 2-5. It should be understood that these dimensions could vary depending on wall thickness, wire thickness and so forth. It is desirable that device 10 is constructed of materials such as polyethylene, polypropylene, metal, plastic, rubber, PVC, and/or others known in the construction industry. Moreover, the device can be manufactured by a variety of methods including 3-D printing, injection molding, casing, CNC molding, die casting, and/or others known in the industry.

FIG. 7 depicts a method of using the device. More specifically, FIG. 7A depicts a standard configuration during construction wherein dangling wire 50 is loosely hanging between two wall studs 60 which have not yet been concealed with drywall. FIG. 7B depicts device 10 attached to stud 60 with wire channel 40 directed outwardly, such that the longitudinal axis of the channel will extend through the subsequently hung drywall, preferably perpendicularly. Actual connection is best shown in FIG. 8, where it is clearly shown that the vertex formed by primary face 20 and flange 30 is positioned on corner of stud 60. In FIG. 7C wire 50 is threaded through channel 40. More specifically, the unconnected end is fed through the back (proximal) end of the channel, furthest away from where the drywall will be hung, with the loose end projecting through the front (distal) end of the channel, so it will extend through the subsequently hung drywall. FIG. 7D depicts a standard sheet of drywall 80, with FIG. 7E depicting drywall that has been modified to include drywall hole 82, through which the distal end of channel 20 will extend when drywall is hung. FIG. 7F depicts drywall 80 hung in the proper position, thereby concealing beams 60, upper portion of wire 50 and device 10 except for protruding channel 40. Lower portion of wire 50 is visible. FIG. 7G depicts what would actually be visible—drywall hole 82 which surrounds channel 40, with wire 50 extending from channel. It is desirable that channel is flush with exterior surface of the drywall to allow lights or other fixtures to be directly wired without the use of an electric box. As shown in FIG. 5, a conduit 45 of varying lengths can be used to achieve the desired protrusion, in the event the exterior wall covering is thicker than the ½ inch of the channel.

It should be understood that many modifications and improvements have been deleted herein for the sake of conciseness and readability but are properly within the scope of the following claims. As used herein, "'frontside' of installed planar wall", and the like, shall refer to the side which typically faces the living space of a structure. "'Backside' of installed planar wall", and the like, shall refer to the side of the wall that is adjacent wall studs. It is important to understand that the device could be used with wall systems other than drywall, for example paneling or masonry. In addition, the device could be used with wires other than electrical wires, for example internet wires, Ethernet, fiber optic, telephone or cable. It could also be used with multiple wires simultaneously. It should also be understood that the illustrations are for the purpose of describing a preferred embodiment of the inventions and are not intended to limit the inventions thereto. It should also be understood that approximations allow variances of +/−10%, unless otherwise noted. It should also be understood that all ranges set forth inherently include the endpoints themselves, as well as all increments, there between.

What is claimed is:

1. A wire retaining device including:
   a. A substantially planar and rectangular primary face having opposing surfaces, a first proximal edge and an opposing first distal edge and including a plurality of securing apertures;
   b. A substantially planar flange having opposing surfaces, a second proximal edge and an opposing second distal edge and including a plurality of securing apertures, said flange oriented approximately perpendicular to said primary face with said flange and said primary face joined along said first proximal edge and said second proximal edge;
   c. A channel extending from said primary face, the longitudinal axis of said channel approximately parallel to said primary face; and
   d. A wall stud having at least a first substantially planar side and an adjoining second substantially planar side, one of said primary face surfaces vertically mounted in direct contact with said first planar side, and one of said flange surfaces mounted in direct contact with said second planar side.

2. The retaining device of claim 1 wherein said channel includes a proximal end and a distal end, said proximal end adjacent said primary face.

3. The retaining device of claim 2 wherein said distal end extends beyond said flange.

4. The retaining device of claim 1 wherein the area of said primary face is greater than the area of said flange.

5. The retaining device of claim 1 further comprising a segment of conduit, said conduit releasably engaged with said channel.

6. The retaining device of claim 1 further comprising a centering mark on said primary face.

7. A system for retaining a wire during construction including:

a. A wall stud including four substantially planar sides and four substantially perpendicular edges;
b. A wire retaining device including a rectangular primary face having opposing surfaces, a first proximal edge and an opposing first distal edge, and a flange having opposing surfaces, a second proximal edge and an opposing second distal edge, said flange oriented approximately perpendicular to said primary face with said flange and said primary face joined along said first proximal edge and said second proximal edge, and a channel extending from said primary face, said wire retaining device vertically mounted on one of said perpendicular edges wherein one of said primary face surfaces is in direct contact with one of said wall stud planar sides, and one of said flange surfaces is in direct contact with another of said wall stud planar sides; and
c. A planar wall material defining a hole, said planar wall material adjacent one side of said wall stud, wherein said channel is aligned with said hole.

8. The system of claim 7 wherein said channel includes a longitudinal axis approximately parallel to said primary face.

9. The system of claim 7 wherein a single wire retaining device is attached to exactly two planar sides and exactly one perpendicular edge.

10. The system of claim 7 said wall material is selected from drywall, paneling, tile, plaster, masonry and combinations thereof.

11. The system of claim 7 wherein said hole accommodates said channel with approximately 1 cm or less of space between said planar wall material and said channel.

12. A method of retaining a wire in a desired position including the acts of:
a. Attaching a wire retaining device vertically to a wall stud including a first substantially planar side and an adjoining second substantially planar side, said wire retaining device including a rectangular primary face having opposing surfaces, a first proximal edge and an opposing first distal edge; a flange having opposing surfaces, a second proximal edge and an opposing second distal edge, said flange oriented approximately perpendicular to said primary face with said flange and said primary face joined along said first proximal edge and said second proximal edge, wherein one of said primary face surfaces is in direct contact with one of said first planar side, and one of said flange surfaces is in direct contact with said second planar side; and a channel extending from said primary face, wherein said channel includes a longitudinal axis approximately parallel to said primary face;
b. Threading the end of a first wire through said channel;
c. Creating a hole in a planar wall material, said hole positioned to correspond with said channel upon mounting said planar wall material;
d. Mounting said planar wall material such that said channel mates with said hole, and said first wire extends from backside to frontside of installed planar wall material with said end of first wire on frontside of installed planar wall material.

13. The method of claim 12 wherein said act of attaching said wire retaining device to a wall stud includes the act of positioning said wire retaining device along one edge of said wall stud.

14. The method of claim 12 wherein the act of attaching said wire retaining device to a wall stud includes the act of attaching said flange to a front-facing surface of said wall stud.

15. The method of claim 12 wherein the act of attaching said wire retaining device to a wall stud includes the act of attaching by a method selected from the group consisting of stapling, nailing, screwing, adhering and combinations thereof.

16. The method of claim 12 further comprising the act of threading the end of a second wire through said channel.

17. The method of claim 12 wherein said act of creating a hole into said planar wall material includes the act of creating a hole sized and shaped to fit said channel with 1 cm or less space between edge of planar wall and channel.

* * * * *